United States Patent
Kang et al.

(10) Patent No.: US 11,817,267 B2
(45) Date of Patent: Nov. 14, 2023

(54) MULTILAYER CAPACITOR

(71) Applicant: SAMSUNG ELECTRO-MECHANICS CO., LTD., Suwon-si (KR)

(72) Inventors: Byung Woo Kang, Suwon-si (KR); Bon Seok Koo, Suwon-si (KR); Jung Min Kim, Suwon-si (KR); Ji Hye Han, Suwon-si (KR); Hye Jin Park, Suwon-si (KR); Sang Wook Lee, Suwon-si (KR); Hong Je Choi, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 17 days.

(21) Appl. No.: 17/712,420

(22) Filed: Apr. 4, 2022

(65) Prior Publication Data
US 2023/0135148 A1    May 4, 2023

(30) Foreign Application Priority Data

Nov. 3, 2021    (KR) .................. 10-2021-0149608

(51) Int. Cl.
*H01G 4/232*    (2006.01)
*H01G 4/30*    (2006.01)
*H01G 4/248*    (2006.01)

(52) U.S. Cl.
CPC ............ *H01G 4/2325* (2013.01); *H01G 4/30* (2013.01); *H01G 4/248* (2013.01)

(58) Field of Classification Search
None
See application file for complete search history.

(56) References Cited

U.S. PATENT DOCUMENTS

| | | | |
|---|---|---|---|
| 2011/0051314 A1* | 3/2011 | Sakurai | H01G 4/30 361/321.1 |
| 2013/0107421 A1 | 5/2013 | Zenzai et al. | |
| 2015/0279563 A1 | 10/2015 | Otani | |
| 2016/0268046 A1* | 9/2016 | Nishisaka | H01G 4/232 |
| 2017/0301468 A1* | 10/2017 | Kim | H01G 4/30 |
| 2019/0013150 A1* | 1/2019 | Koo | H01G 4/2325 |
| 2019/0252123 A1* | 8/2019 | Kim | H01G 4/12 |

(Continued)

FOREIGN PATENT DOCUMENTS

| | | | | |
|---|---|---|---|---|
| EP | 1783790 B1 * | 7/2010 | | H01G 4/12 |
| EP | 2065908 B1 * | 9/2018 | | H01G 4/232 |

(Continued)

*Primary Examiner* — Dion R. Ferguson
(74) *Attorney, Agent, or Firm* — Morgan, Lewis & Bockius LLP (57) ABSTRACT

A multilayer capacitor, includes: a body including a dielectric layer and first and second internal electrode, and a first external electrode and a second external electrode, each disposed an exterior of the body, the first external electrode being connected to the first internal electrode and the second external electrode being connected to the second internal electrode, wherein the first external electrode and the second external electrode include an electrode layer disposed on the body, and including a first intermetallic compound and glass; and a conductive resin layer disposed on the electrode layer, and including a plurality of metal particles and a resin.

19 Claims, 4 Drawing Sheets

(56) References Cited

U.S. PATENT DOCUMENTS

| | | | |
|---|---|---|---|
| 2019/0295773 A1* | 9/2019 | Kim | H01G 4/2325 |
| 2020/0176189 A1* | 6/2020 | Koo | H01G 4/232 |
| 2021/0118616 A1* | 4/2021 | Koo | H01G 4/232 |
| 2022/0189696 A1* | 6/2022 | Yi | H01G 4/248 |
| 2023/0135148 A1* | 5/2023 | Kang | H01G 4/232 |
| | | | 361/301.4 |

FOREIGN PATENT DOCUMENTS

| | | | | |
|---|---|---|---|---|
| JP | 2013-118356 A | 6/2013 | | |
| JP | 6094596 B2 | 3/2017 | | |
| JP | 2019016781 A | * 1/2019 | | H01G 4/005 |
| KR | 10-2020-0064860 A | 6/2020 | | |

* cited by examiner

FIG. 6

MULTILAYER CAPACITOR

CROSS-REFERENCE TO RELATED APPLICATION(S)

This application claims the benefit of priority to Korean Patent Application No. 10-2021-0149608 filed on Nov. 3, 2021 in the Korean Intellectual Property Office, the disclosure of which is incorporated herein by reference in its entirety.

TECHNICAL FIELD

The present disclosure relates to a multilayer capacitor.

BACKGROUND

A multilayer capacitor is an important chip component used in industries such as the communications, computing, home appliance, and automotive industries, due to advantages thereof, such as miniaturization, high capacitance, and ease of mounting. In particular, the multilayer capacitor is a key passive element used in various electric, electronic and information communication devices such as mobile phones, computers, and digital TVs.

In recent years, with the miniaturization and high performance of electronic devices, the multilayer capacitor has also tended to be miniaturized and to retain high-capacitance, and with this trend, a degree of importance of securing high reliability of the multilayer capacitor is increasing.

As a method to secure high reliability of such a multilayer capacitor, a conductive resin layer is being applied to an external electrode to absorb tensile stress generated in a mechanical or thermal environment, and to prevent cracks caused by the stress.

The conductive resin layer serves to electrically and mechanically bond a sintered electrode layer of an external electrode and a plating layer of the multilayer capacitor, and protect the multilayer capacitor from mechanical and thermal stress depending on a process temperature and a bending impact of the board when mounted on a circuit board.

However, in the case of a conventional multilayer capacitor, a sintered electrode layer is formed to be thick to prevent deterioration of moisture reliability, and then a conductive resin layer is formed on the sintered electrode layer, thereby limiting the miniaturization of the multilayer capacitor.

In addition, in the case of the conductive resin layer, since metal particles having conductivity are dispersed in the conductive resin layer, adhesion to the sintered electrode layer may be weak, so that there may be a problem in which lifting may occur at an interface.

In addition, in the case of the conductive resin layer, there has been a problem in that the electrical conductivity between the sintered electrode layer and the conductive resin layer has been lowered due to weak electrical conductivity because metal particles having conductivity were dispersed in the conductive resin layer.

SUMMARY

One of several objects of the present disclosure is to reduce a size of a multilayer capacitor by solving a problem in which an external electrode of the multilayer capacitor becomes excessively thick as a sintered electrode layer is thickly formed in order to secure moisture resistance reliability.

One of several objects of the present disclosure is to improve mechanical bonding strength of the multilayer capacitor to prevent lifting at an interface.

One of several objects of the present disclosure is to solve a problem of weak electrical conductivity by securing electrical connectivity of the multilayer capacitor.

However, the object of the present disclosure is not limited to the above, and will be more easily understood in the course of describing specific embodiments of the present disclosure.

According to an aspect of the present disclosure, a multilayer capacitor includes: a body including a dielectric layer and a first internal electrode and a second internal electrode, and a first external electrode and a second external electrode disposed an exterior of the body, the first external electrode being connected to the first internal electrode and the second external electrode being connected to the second internal electrode, wherein the first external electrode and the second external electrode include an electrode layer disposed on the body, and including a first intermetallic compound and glass; and a conductive resin layer disposed on the electrode layer, and including a plurality of metal particles and a resin.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described as follows with reference to the attached drawings. The shape and size of constituent elements in the drawings may be exaggerated or reduced for clarity. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

The contents of the present disclosure described below may have a variety of configurations and propose only a required configuration herein, but are not limited thereto.

The disclosure is not intended to limit the techniques described herein to specific embodiments, and it should be understood to include various modifications, equivalents, and/or alternatives to the embodiments of the present disclosure. In connection with the description of the drawings, similar reference numerals may be used for similar components.

In the drawings, for clarity of description, parts irrelevant to the description may be omitted, and thicknesses of elements may be magnified to clearly represent layers and regions. Components having the same functions within a scope of the same idea may be described using the same reference numerals. In the present specification, expressions such as "having", "may have", "include" or "may include" may indicate a presence of corresponding features (e.g., components such as numerical values, functions, operations, components, or the like), and may not exclude a presence of additional features.

In the drawings, a first direction may be defined as a stacking direction or a thickness (T) direction, a second direction may be defined as a length (L) direction, and a third direction may be defined as a width (W) direction.

Hereinafter, a multilayer capacitor according to an embodiment of the present disclosure will be described with reference to FIGS. 1 to 4.

A multilayer ceramic capacitor 100 according to an embodiment of the present disclosure includes, a body 110 including a dielectric layer 111 and a first internal electrode 121 and a second internal electrode 122, a first external electrode 130 and a second external electrode 140, disposed an exterior of the body, the first external electrode 130 being connected to the first internal electrode and the second external electrode 140 being connected to the second internal electrode, wherein the first external electrode and the second external electrode include electrode layers 131 and 141 disposed on the body, and respectively including first intermetallic compounds 131a and 141a and glass 131b and 141b, and conductive resin layers 132 and 142 disposed on the electrode layers, and including a plurality of metal particles 132a and 142a and resins 132b and 142b.

In the body 110, a dielectric layer 111 and a first internal electrode 121 and a second internal electrode 122 are alternately stacked.

Although a specific shape of the body 110 is not particularly limited, as shown, the body 110 may be formed in a hexahedral shape or a shape similar thereto. Due to shrinkage of ceramic powder contained in the body 110 during a sintering process, or polishing of a corner portion, the body 110 may have a substantially hexahedral shape, although not a hexahedral shape having perfect straight lines.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first and second surfaces 1 and 2, connected to the third and fourth surfaces 3 and 4 and opposing each other in a third direction.

In some embodiments, a plurality of dielectric layers 111 are stacked over each other forming the body 110. The plurality of dielectric layers 111, in such embodiments, may be in a sintered state, and boundaries between adjacent dielectric layers 111 may be integrated such that they may be difficult to confirm without using a scanning electron microscope (SEM).

According to an embodiment of the present disclosure, a raw material for forming the dielectric layer 111 is not particularly limited, as long as sufficient capacitance may be obtained therewith. For example, a barium titanate-based material, a lead composite perovskite-based material, a strontium titanate-based material, or the like may be used. The barium titanate-based material may include $BaTiO_3$-based ceramic powder. For example, the ceramic powder, may be $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$ or the like, in which $BaTiO_3$, and Ca (calcium) and Zr (zirconium) are partially dissolved in $BaTiO_3$.

A variety of ceramic additives, organic solvents, plasticizers, binders, dispersants, and the like may be added to powder particles such as barium titanate ($BaTiO_3$), and the like, depending on the purpose of the present disclosure.

In this case, a thickness of the dielectric layer 111 may be arbitrarily changed according to a capacitance design of the multilayer ceramic capacitor 100, and a thickness of a first layer may be configured to be 0.1 to 10 μm after sintering in consideration of the size and capacity of the body 110. However, the present disclosure is not limited thereto.

The body 110 may include a capacitance formation portion A disposed inside the body 110, and including a first internal electrode 121 and a second internal electrode 122 disposed to oppose each other with a dielectric layer 111 interposed therebetween, and having capacitance formed therein, and cover portions 112 and 113 formed in upper and lower portions of the capacitance formation portion A.

In addition, the capacitance formation portion A is a portion contributing to capacitance formation of the capacitor, and may be formed by repeatedly stacking the plurality of a first internal electrode 121 and a second internal electrode 122 with the dielectric layer 111 interposed therebetween.

An upper cover portion 112 and a lower cover portion 113 may be formed by stacking a single dielectric layer or two or more dielectric layers on upper and lower surfaces of the capacitance formation portion A in a first direction or in a thickness direction, respectively, and can serve to prevent damage to the internal electrode due to physical or chemical stress.

The upper and lower cover portions 112 and 113 may have the same material and configuration as the dielectric layer 111 of the active region, except that they do not include internal electrodes.

The upper and lower cover portions 112 and 113 may each have a thickness of 25 µm or less, but the present disclosure is not limited thereto.

In addition, margin portions 114 and 115 may be disposed on a side surface of the capacitance formation portion A. The margin portions 114 and 115 may include a margin portion 114 disposed on the sixth surface 6 of the body 110 and a margin portion 115 disposed on the fifth surface 5 of the body 110. That is, the margin portions 114 and 115 may be disposed on both side surfaces of the body 110 in a third direction.

Figure 1:
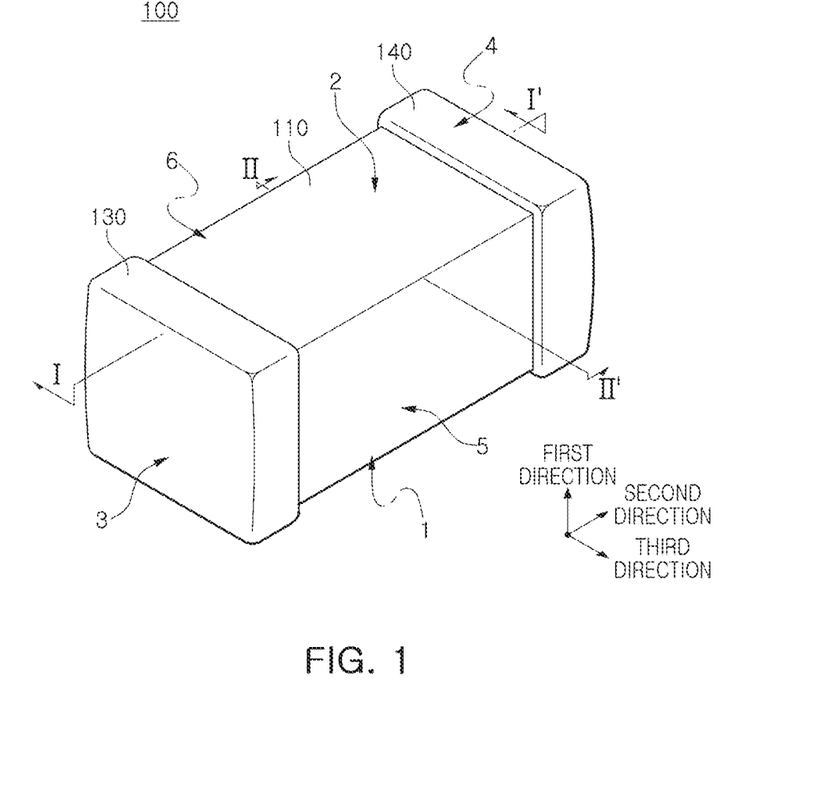
FIG. 1 is a perspective view schematically illustrating a multilayer capacitor according to an embodiment of the present disclosure.
Figure 2:
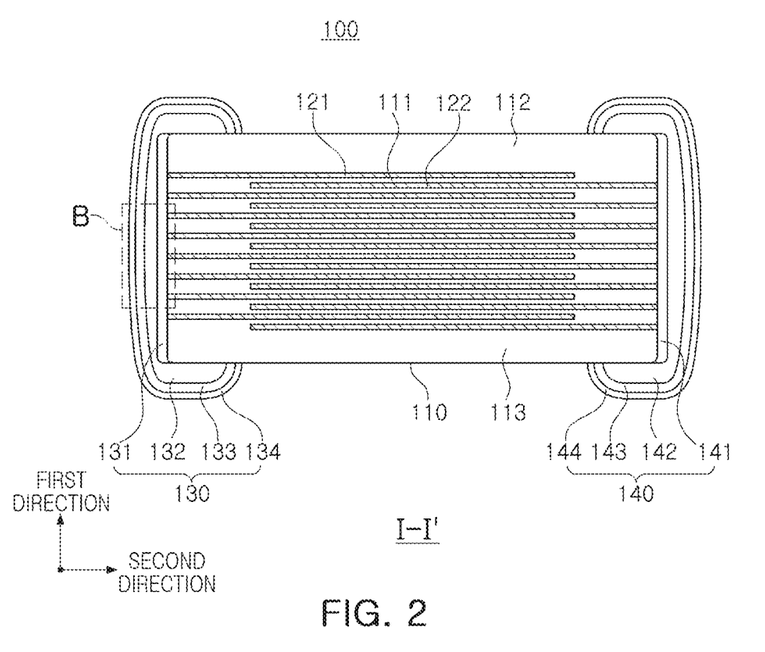
FIG. 2 schematically illustrates a cross-sectional view taken along line I-I' of FIG. 1.
Figure 3:
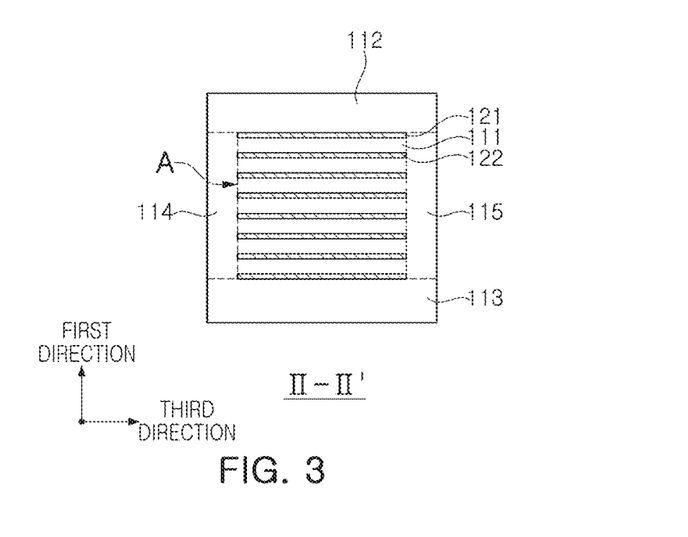
FIG. 3 schematically illustrates a cross-sectional view taken along II-II' of FIG. 1.

As shown in FIG. 3, the margin portions 114 and 115 may mean a region between both ends of the first internal electrode 121 and the second internal electrode 122 and a boundary surface of the body 110 in a cross-section of the body 110 cut in first and third directions.

The margin portions 114 and 115 may basically serve to prevent damage to internal electrodes due to physical or chemical stress.

The margin portions 114 and 115 may be formed by forming internal electrodes by applying a conductive paste on a ceramic green sheet except where a margin portion is to be formed.

In addition, in order to suppress a step difference caused by the first and second internal electrodes 121 and 122, after the first and second internal electrodes 121 and 122 are cut to be exposed to the fifth and sixth surfaces 5 and 6 of the body after lamination, margin portions 114 and 115 may also be formed by stacking a single dielectric layer or two or more dielectric layers on both side surfaces of the capacitance formation portion A in a third direction.

The margin portions 114 and 115 may have a thickness of, for example, 20 µm or less, but the present disclosure is not limited thereto.

The first and second internal electrodes 121 and 122 may be alternately disposed with the dielectric layer 111, and the first internal electrode 121 and the second internal electrode 122 may be disposed to face each other with the dielectric layer 111 interposed therebetween.

That is, the first internal electrode 121 and the second internal electrode 122 are a pair of electrodes having different polarities, and may be formed by printing a conductive paste for internal electrodes including a conductive metal having a predetermined thickness on the dielectric layer 111 to be exposed alternately through the third and fourth surfaces 3 and 4 of the body 110 in a stacking direction of the dielectric layer 111 with the dielectric layer 111 interposed therebetween, and may be electrically insulated by the dielectric layer 111 disposed in the middle. As a method for printing the conductive paste for internal electrodes, a screen printing method, a gravure printing method, or the like may be used, but the present disclosure is not limited thereto.

Accordingly, the first internal electrode 121 may be electrically connected to the first external electrode 130 on the third surface 3, and the second internal electrode 122 may be in contact with the second external electrode 140 on the fourth surface 4 to be electrically connected.

When a voltage is applied to the first external electrode 130 and the second external electrode 140, charges are accumulated between the first internal electrode 121 and the second internal electrode 122 facing each other, and in this case, capacitance of the multilayer ceramic capacitor 100 is proportional to an area of a region of the first internal electrode 121 and the second internal electrode 122 overlapping each other.

A thickness of the first internal electrode 121 and the second internal electrode 122 may be determined according to the purpose, for example, may be determined to be in a range of 0.2 to 1.0 µm in consideration of the size and capacitance of the body 110, but the present disclosure is not limited thereto.

The conductive metal included in the first and second internal electrodes 121 and 122 may be at least one of nickel (Ni), copper (Cu), palladium (Pd), silver (Ag), gold (Au), platinum (Pt), tin (Sn), tungsten (W), titanium (Ti), and alloys thereof, but the present disclosure is not limited thereto.

According to an embodiment of the present disclosure, the first external electrode 130 and the second external electrode 140 may include electrode layers 131 and 141 disposed on the body, and including first intermetallic compounds 131a and 141a and glass 131b and 141b, and conductive resin layers 132 and 142 disposed on the electrode layers, and including a plurality of metal particles 132a and 142a and resins 132b and 142b.

The electrode layers 131 and 141 may include first intermetallic compounds 131a and 141a and glass 131b and 141b, and are directly connected to the first internal electrode 121 and the second internal electrode 122 to ensure electrical conduction between an external electrode and an internal electrode.

That is, the electrode layers 131 and 141 are respectively disposed on the third and fourth surfaces 3 and 4 of the body 110, and respectively in contact with the first and second internal electrode 121 and 122 alternately exposed through the third and fourth surfaces 3 and 4 of the body 110, to be electrically connected, such that electrical conduction between the first external electrode 130 and first internal electrode 121, and the second external electrode 140 and the and the second internal electrode 122 is ensured.

The glass 131b and 141b serve to fill an empty space when a metal component included in the conductive paste forming the electrode layers 131 and 141 is contracted during a sintering process, and at the same time, provide bonding strength between the external electrode and the body.

In addition, when the metal component included in the conductive paste is contracted during the sintering process, the glass 131b and 141b may fill an empty space, thereby increasing density of the electrode layers 131 and 141.

The glass 131b and 141b may increase the density of the electrode layers 131 and 141 to effectively suppress penetration of a plating solution and/or external moisture.

The glass 131b and 141b may have a composition in which oxides are mixed, but are not particularly limited, but may be one or more selected from a group consisting of silicon oxide, boron oxide, aluminum oxide, transition metal oxide, alkali metal oxide, and alkaline earth metal oxide. The transition metal may be at least one selected from a group consisting of zinc (Zn), titanium (Ti), vanadium (V), manganese (Mn), iron (Fe), and nickel (Ni), the alkali metal may be selected from a group consisting of lithium (Li), sodium (Na) and potassium (K), and the alkaline earth metal may be at least one selected from a group consisting of magnesium (Mg), calcium (Ca), strontium (Sr), and barium (Ba).

When electrode layers 131 and 141 are formed by coating and sintering a conductive paste including glass and one selected from copper (Cu), nickel (Ni) or an alloy thereof as a metal component on the body 110, the first intermetallic compounds 131a and 141a may be formed by reacting with a low-melting point metal further included in the conductive paste with each other.

Alternatively, in a process of forming the conductive resin layers 132 and 142 by applying and drying a conductive resin composition containing a low-melting point metal, and curing heat treatment of the same, it may be formed by reacting a metal component included in the conductive paste and a low-melting point metal included in the conductive resin composition with each other.

The first intermetallic compounds 131a and 141a may include at least one of a copper-tin (Cu—Sn) and a nickel-tin (Ni—Sn) intermetallic compound.

That is, one selected from copper (Cu), nickel (Ni), and alloys thereof, which are metal components included in the conductive paste for forming the electrode layers 131 and 141 and tin(Sn), which is a low-melting point metal included in the conductive paste or tin included in a conductive resin composition for forming a conductive resin layer, may react with each other, such that at least one of copper-tin (Cu—Sn) and nickel-tin (Ni—Sn) intermetallic compounds may be formed.

When copper (Cu) is included as metal particles included in the conductive paste forming the electrode layers 131 and 141, the first intermetallic compounds 131a and 141a may include a copper-tin (Cu—Sn) intermetallic compound, and the copper-tin (Cu—Sn) intermetallic compound may include at least one of $Cu_6Sn_5$ and $Cu_3Sn$.

When nickel (Ni) is included as metal particles included in the conductive paste forming the electrode layers 131 and 141, the first intermetallic compounds 131a and 141a may include a nickel-tin (Ni—Sn) intermetallic compound, and the nickel-tin (Ni—Sn) intermetallic compound may include $Ni_3Sn$.

In addition, when copper (Cu) and nickel (Ni) are included as metal particles included in the conductive paste forming the electrode layers 131 and 141, the first intermetallic compounds 131a and 141a may include at least one among $Cu_6Sn_5$, $Cu_3Sn$ and $Ni_3Sn$.

Since, in the conventional conductive resin layers 132 and 142, a plurality of metal particles 132a and 142a exist in a dispersed form in the resins 132b and 142b, there was a problem of being vulnerable to penetration of a plating solution and/or external moisture due to a difference in components between the electrode layers 131 and 141 and the conductive resin layers 132 and 142.

In addition, in order to compensate for the problem of being vulnerable to external moisture penetration, a thickness of the electrode layers 131 and 141 must be formed above a certain level, and accordingly, there was a problem in that the thickness of the first and second external electrodes 130 and 140 is increased to increase the size of the multilayer capacitor 100.

According to an embodiment of the present disclosure, the electrode layers 131 and 141 may include the first intermetallic compounds 131a and 141a, so that sufficient bonding strength between the electrode layers 131 and 141 and the conductive resin layers 132 and 142 can be secured, so that lifting, or the like at an interface can be prevented.

In addition, since the electrode layers 131 and 141 include the first intermetallic compounds 131a and 141a, penetration of the plating solution and/or external moisture between the electrode layers 131 and 141 and the conductive resin layers 132 and 142 can be prevented, such that moisture resistance reliability of the multilayer capacitor 100 may be improved.

As described above, the first intermetallic compounds 131a and 141a may be an intermetallic compound formed by reacting a metal component for forming the electrode layer and a low-melting point metal included in a conductive resin composition for forming the conductive resin layer with each other.

In particular, the first intermetallic compounds 131a and 141a may be formed while the low-melting point metal is diffused into the electrode layers 131 and 141 during the curing heat treatment process of the conductive resin composition.

Accordingly, the first intermetallic compounds 131a and 141a may be formed from the interface between the electrode layers 131 and 141 and the conductive resin layer 132 and 142, and all metal components included in the electrode layers 131 and 141 may react with the low-melting point metal according to the curing heat treatment conditions.

That is, the electrode layers 131 and 141 may be formed of only the first intermetallic compounds 131a and 141a and the glass 131b and 141b. However, as described above, the electrode layers 131 and 141 may be formed by reacting a metal component thereof with tin (Sn) included in the conductive paste.

As such, when the metal component included in the electrode layers 131 and 141 sufficiently react with the low-melting point metal, more preferably, when all of the metal component included in the electrode layers 131 and 141 reacts with the low-melting point metal, metal-metal bonding strength between the metal component included in the electrode layers 131 and 141 and the low-melting point metal may be further improved, so that it is possible to suppress an occurrence of lifting, or the like, at an interface between the electrode layers 131 and 141 and the conductive resin layers 132 and 142.

In addition, since the first intermetallic compounds 131a and 141a are formed in the electrode layers 131 and 141, the moisture resistance reliability of the multilayer capacitor 100 may be improved, and resistance to mechanical stress such as bending strength, or the like and chemical resistance characteristics may be improved.

Additionally, when the metal component included in the electrode layers 131 and 141 sufficiently reacts with the low melting point metal, more preferably, when all of the metal component included in the electrode layers 131 and 141 reacts with the low-melting point metal, even when the electrode layers 131 and 141 are thinly formed, the moisture resistance reliability of the multilayer capacitor 100 may be further improved. That is, the multilayer capacitor 100 can be further miniaturized while securing moisture resistance reliability.

In an embodiment of the present disclosure, a thickness of the electrode layers 131 and 141 may be 1 to 15 μm. Even if the thickness of the electrode layers 131 and 141 fall within the above range, moisture resistance reliability of the multilayer capacitor 100 may be improved compared to the related art. Accordingly, the multilayer capacitor 100 can be easily miniaturized.

In an embodiment of the present disclosure, the first intermetallic compounds 131a and 141a may be in direct contact with the first internal electrode 121 and the second internal electrode 122.

Figure 4:
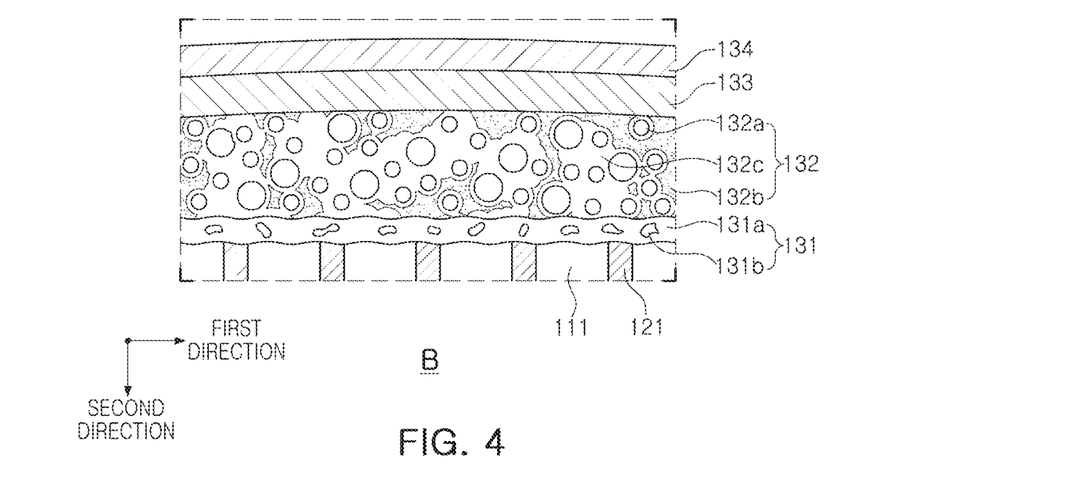
FIG. 4 is an enlarged view illustrating an enlarged area B of FIG. 2.

When a metal component included in the electrode layers 131 and 141 sufficiently reacts with the low-melting point metal, more preferably, the metal component included in the electrode layers 131 and 141 all reacts with the low-melting point metal to form first intermetallic compounds 131a and 141a, as shown in FIG. 4, the first intermetallic compounds 131a and 141a may be in direct contact with the first internal electrode 121 and the second internal electrode 122 to be electrically connected to each other.

When the first intermetallic compounds 131a and 141a are in direct contact with the first internal electrode 121 and the second internal electrode 122, the mechanical bonding strength of the multilayer capacitor 100 may be improved by metal-metal bonding strength between the first intermetallic compounds 131a and 141a and the first internal electrode 121 and the second internal electrode 122. Accordingly, the bonding strength of the electrode layers 131 and 141 may be improved.

In an embodiment of the present disclosure, the electrode layers 131 and 141 may be disposed on the third and fourth surfaces 3 and 4 of the body 110. That is, the electrode layers 131 and 141 may be disposed only on the third and fourth surfaces 3 and 4 of the body 110.

When the electrode layers 131 and 141 are disposed only on the third and fourth surfaces 3 and 4 of the body 110, bending strength, ESR, and the like, of the multilayer capacitor 100 may be further improved. In addition, the multilayer capacitor 100 can be easily miniaturized.

Figure 5:
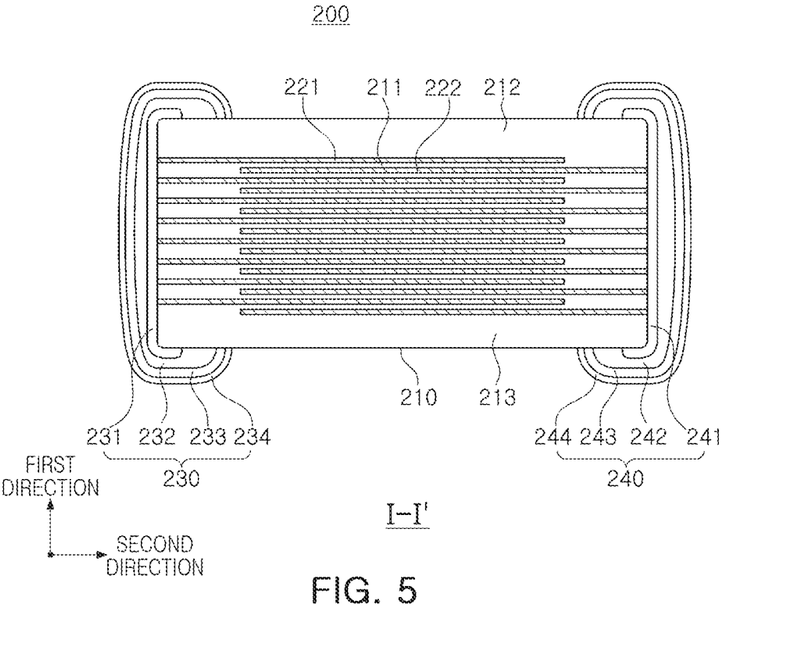
FIG. 5 schematically illustrates a cross-sectional view taken along line I-I' of FIG. 1 illustrating an embodiment of the present invention.

Referring to FIG. 5, in an embodiment of the present disclosure, electrode layers 231 and 241 may be disposed on the third and fourth surfaces of a body 210, and may extend to a portion of the first, second, fifth, and sixth surfaces of the body 210.

When the electrode layer extends to a portion of the first, second, fifth, and sixth surfaces of the body 210, adhesion strength, corrosion resistance, and the like, of the multilayer ceramic capacitor 200 may be further improved.

Region B of FIG. 4 illustrates an enlarged end portion of a first external electrode 130, but there is only a difference between the first and second external electrodes 130 and 140 in that the first external electrode 130 is electrically connected to the first internal electrode 121 while the second external electrode 140 is electrically connected to the second internal electrode 122. Since the configurations of the first external electrode 130 and the second external electrode 140 are similar to each other, hereinafter, it will be described with reference to the first external electrode 130, but it is considered that the description of the second external electrode 140 is included.

A conductive resin layer 132 is disposed on the electrode layer, and includes a plurality of metal particles 132a and a resin 132b.

The resin 132b may include a thermosetting resin having electrical insulation properties. In this case, the thermosetting resin may be, for example, an epoxy resin, and the present disclosure is not limited thereto.

The conductive resin layer 132 serves to electrically and mechanically bond the electrode layers 131 and 141 and a plating layer formed on the conductive resin layer 132, and when the multilayer capacitor 100 is mounted on a substrate, the conductive resin layer 132 may absorb tensile stress generated in a mechanical or thermal environment to prevent cracks from occurring, and serve to protect the multilayer capacitor 100 from bending impacts of the substrate.

In this case, the conductive resin layer 132 may be formed by applying a conductive resin composition in which a plurality of metal particles 132a are dispersed to the resin 132b on the electrode layer 131, and then performing drying and curing heat treatment processes.

Therefore, unlike the conventional method of forming an external electrode by sintering, the metal particles 132a may not be completely melted, so that they exist in a randomly distributed form in the resin 132b and may be included in the conductive resin layer 132.

The plurality of metal particles 132a may include at least one of copper (Cu), silver (Ag), silver (Ag)-coated copper (Cu), and tin (Sn)-coated copper (Cu).

A size of the plurality of metal particles 132a may be 0.5 to 3 μm, but the present disclosure is not limited thereto.

Figure 6:
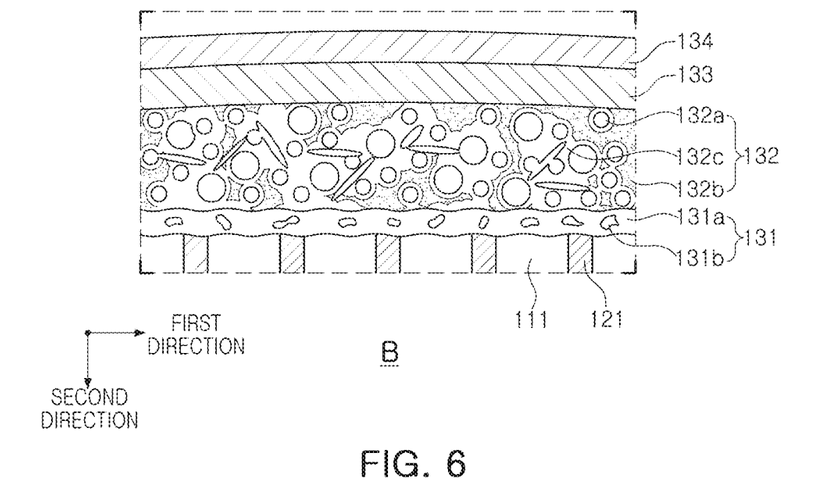
FIG. 6 is an enlarged view of area B of FIG. 2 illustrating an embodiment of the present disclosure.

The plurality of metal particles 132a included in the conductive resin layer 132 may be formed of not only spherical but also flake-shaped metal particles, and as illustrated in FIG. 6, the plurality of metal particles 132a may be formed of a mixed type of spherical metal particles and flake-shaped metal particles.

In an embodiment of the present disclosure, the conductive resin layer 132 may further include a conductive connection portion 132c connecting the plurality of metal particles 132a, and the conductive connection portion 132c may include a low-melting point metal having a low-melting point lower than a curing temperature of the resin 132b.

The conductive connection portion 132c may include a low-melting point metal having a melting point lower than the curing temperature of the resin 132b, surround the plurality of metal particles 132a to serve to connect to each other, and thus internal stress within the body 110 may be minimized, and high-temperature load and moisture-resistant load characteristics can be improved.

The conductive connection portion 132c may serve to increase electrical conductivity of the conductive resin layer 132 to serve to lower resistance of the conductive resin layer 132.

In this case, the low-melting point metal included in the conductive connection portion 132c may have a lower melting point than the curing temperature of the resin 132b. A melting point of the low-melting point metal included in the conductive connection portion 132c may be 300° C. or lower, but the present disclosure is not limited thereto.

The low-melting point metal included in the conductive connection portion 132c may be tin (Sn) or a tin (Sn) alloy, and since tin (Sn) has a lower melting point than the curing temperature of the resin 132b, tin (Sn) is melted in drying and hardening heat treatment processes, so that the conductive connection portion 132c covers the plurality of metal particles 132a.

Meanwhile, the plurality of metal particles 132a may not exist in the conductive resin layer 132 when the plurality of metal particles 132a all react with the low-melting point metal included in the conductive connection portion 132c. In other words, the conductive resin layer 132 may include the conductive connection portion 132c and the resin 132b, but may not include the metal particles 132a.

Conversely, the conductive resin layer 132 may include the metal particles 132a and the resin 132b, but may not include the conductive connection portion 132c.

In an embodiment of the present disclosure, the conductive connection portion 132c may further include a second intermetallic compound.

The second intermetallic compound may be an intermetallic compound formed in such a manner that at least one of copper (Cu) and tin (Sn)-coated copper (Cu) included in a conductive resin composition forming a conductive resin layer 132 reacts with tin (Sn), a low-melting point metal particle.

Accordingly, the second intermetallic compound included in the conductive connection portion 132c may include at least one of $Ag_3Sn$, $Cu_3Sn$ and $Cu_6Sn_5$.

In an embodiment of the present disclosure, at least a portion of the conductive connection portion 132c may be in direct contact with at least a portion of the electrode layer 131. As a result, the electrical connectivity between the electrode layer 131 and the conductive resin layer 132 can be further improved, and the mechanical bonding strength may be improved by intermetallic bonding with the first intermetallic compound 131a included in the electrode layer 131 to suppress occurrence of lifting, or the like.

In an embodiment of the present disclosure, first and second external electrodes 130 and 140 may further include a plating layer disposed on the conductive resin layers 132 and 142.

The plating layer serves to improve mounting characteristics of the multilayer capacitor 100. The plating layer may include at least one of Ni, Sn, Cu, Pd, and alloys thereof, and may include a plurality of layers.

In this case, at least a portion of the conductive connection portion 132c may be in direct contact with at least a portion of the plating layer and at least a portion of the electrode layer 131. Accordingly, electrical connectivity and mechanical bonding strength between the plating layer, the conductive resin layer 132 and the electrode layer 131 may be further improved.

Referring to FIG. 4, in an embodiment of the present disclosure, the plating layer may include a nickel (Ni) plating layer 133 and a tin (Sn) plating layer 134 formed by sequentially stacking on the conductive resin layer 132.

In this case, the nickel plating layer 133 is in contact with a resin 132b and the conductive connection portion 132c of the conductive resin layer 132. The nickel plating layer 133 serves to prevent dissolution of solder when the multilayer capacitor 100 is mounted.

In addition, the tin plating layer 134 formed on the nickel plating layer 133 serves to improve wettability of the solder when the multilayer capacitor 100 is mounted.

In addition to the conductive resin layer 132, the nickel plating layer 133 and the tin plating layer 134 may also serve to prevent penetration of external moisture, thereby further improving the moisture resistance reliability of the multilayer capacitor 100.

Hereinafter, a method for manufacturing a multilayer capacitor according to an embodiment of the present disclosure will be described in detail, but the present disclosure is not limited thereto. A description overlapping with the description will be omitted.

In a method of manufacturing a multilayer capacitor according to an embodiment of the present disclosure, first, a slurry formed including powder such as barium titanate ($BaTiO_3$), or the like, is coated on a carrier film and dried to prepare a plurality of ceramic green sheets. Thus a dielectric layer and a cover can be formed.

The ceramic green sheet may be formed by mixing ceramic powder, a binder, and a solvent to prepare a slurry, and manufacturing the slurry into a sheet having a thickness of several μms by a doctor blade method, or the like.

Next, a conductive paste for internal electrodes containing conductive metal such as nickel (Ni), copper (Cu), palladium (Pd), silver (Ag), gold (Au), platinum (Pt), tin (Sn), tungsten (W), titanium (Ti), and an alloy thereof is applied thereto, by a screen-printing method, or the like, to form internal electrodes.

Thereafter, a body may be prepared by stacking a plurality of layers of green sheets on which internal electrodes are printed, stacking a plurality of layers of green sheets on which internal electrodes are not printed on the upper and lower surfaces of the laminate, and then sintering the same. In this case, the internal electrode may include first and second internal electrodes having different polarities.

That is, the body includes a dielectric layer, first and second internal electrodes, and a cover. The dielectric layer is formed by sintering a green sheet having internal electrodes printed thereon, and the cover is formed by sintering a green sheet having no internal electrodes printed thereon.

Next, an electrode layer is formed on one surface and the other surface of the body.

The electrode layer may be formed by applying a conductive paste including copper (Cu), nickel (Ni) or an alloy thereof and glass to one surface and the other surface of the body. In addition, the conductive paste may further include tin (Sn).

The electrode layer may be formed by a dipping method, but an embodiment thereof is not limited thereto, and the electrode layer may be formed using a method of attaching or transferring a sheet, an electroless plating method, or a sputtering method.

In particular, the electrode layer may be disposed on the third and fourth surfaces of the body, and a method of attaching a sheet may be adopted to form the electrode layer on the third and fourth surfaces, but the present disclosure is not limited thereto.

In addition, the electrode layer may extend to a portion of the first, second, fifth and sixth surfaces of the body, and in order to form an electrode layer extending to a portion of the first, second, fifth and sixth surfaces of the body, a method of dipping a conductive paste may be adopted, but the present disclosure is not limited thereto.

After the conductive paste is applied and dried, the electrode layer may be formed by sintering the conductive paste. In this case, tin (Sn) included in the conductive paste and copper (Cu), nickel (Ni), or an alloy thereof included in the electrode layer may react with each other. Accordingly, a first intermetallic compound may be formed in the electrode layer.

Next, after coating and drying a conductive resin composition including a plurality of metal particles and a resin on an electrode layer, a curing heat treatment may be performed to form a conductive resin layer including a plurality of metal particles and a resin.

The conductive resin composition may include one or more metal particles selected from copper, silver, silver-coated copper, and tin-coated copper.

The thermosetting resin may include, for example, an epoxy resin, and the present disclosure is not limited thereto. For example, the thermosetting rein may be a bisphenol A resin, a glycol epoxy resin, a novolak epoxy resin, or a liquid resin at room temperature due to a small molecular weight among derivatives thereof.

In this case, the conductive resin composition may include a low-melting-point metal having a melting point lower than a curing temperature of the resin.

The low-melting-point metal particles may include Sn-based solder powder, and may be prepared by mixing the metal particles, Sn-based solder powder, an oxide film remover, and 4 to 15% of a thermosetting resin, and then dispersing the same using a 3-roll mill.

Sn-based solder powder may include at least one selected from Sn, $Sn_{96.5}Ag_{3.0}Cu_{0.5}$, $Sn_{42}Bi_{58}$ and $Sn_{72}Bi_{28}$, and the size of the metal particles may be 0.5 to 3 µm, but the present disclosure is not limited thereto.

In the operation of applying and curing the conductive resin composition, a low-melting-point metal included in the conductive resin composition may be melted to react with a metal component included in the electrode layer. Accordingly, a first intermetallic compound may be formed in the electrode layer.

In particular, all metal components included in the electrode layer may react with the low-melting-point metal according to curing conditions such as a curing heat treatment temperature, a curing heat treatment time, and the like, to form the first intermetallic compound. In this case, the electrode layer may be formed of only a first intermetallic compound and glass, and a metal component, not forming the intermetallic compound may not exist.

As for the curing conditions, the higher a temperature increase rate during the curing heat treatment, the more the curing in a nitrogen ($N_2$) atmosphere, the longer an isothermal heat treatment time, the intermetallic compound may be sufficiently formed, but the present disclosure is not limited thereto, and it is sufficient to have curing conditions in which the intermetallic compound may be sufficiently formed.

In addition, an operation of forming a plating layer on the conductive resin layer may be further included. For example, a nickel plating layer may be formed on the conductive resin layer, and a tin plating layer may be formed on the nickel plating layer.

As set forth above, according to one of the various effects of the present disclosure, a size of the multilayer capacitor may be reduced by securing moisture resistance reliability while a thickness of a sintered electrode layer.

According to one of the various effects of the present disclosure, mechanical bonding strength of the multilayer capacitor may be improved to suppress an occurrence of lifting at an interface thereof.

According to one of the several effects of the present disclosure, a problem of weak electrical conductivity may be solved by securing electrical connectivity of the multilayer capacitor.

However, various and advantageous advantages and effects of the present invention are not limited to the above description, and will be more readily understood in the process of describing specific embodiments of the present invention.

While the embodiments have been illustrated and described above, it will be apparent to those skilled in the art that modifications and variations could be made without departing from the scope in the embodiment as defined by the appended claims.

What is claimed is:

1. A multilayer capacitor, comprising:
a body including a dielectric layer and a first internal electrode and a second internal electrode; and
a first external electrode and a second external electrode, each disposed on an exterior of the body, the first external electrode being connected to the first internal electrode and the second external electrode being connected to the second internal electrode, wherein the first external electrode and the second external electrode include: an electrode layer disposed on the body and covering the first and second internal electrodes and the dielectric layer, the electrode layer including a first intermetallic compound directly contacting the first and second internal electrodes, and glass dispersed within the first intermetallic compound; and
a conductive resin layer disposed on the electrode layer, and including a plurality of metal particles and a resin.

2. The multilayer capacitor of claim 1, wherein the conductive resin layer further comprises a conductive connection portion connecting a plurality of metal particles,
wherein the conductive connection portion includes a low-melting point metal having a melting point lower than a curing temperature of the resin.

3. The multilayer capacitor of claim 1, wherein the first intermetallic compound comprises at least one of $Cu_6Sn_5$, $Cu_3Sn$, and $Ni_3Sn$.

4. The multilayer capacitor of claim 2, wherein the conductive connection portion further comprises a second intermetallic compound.

5. The multilayer capacitor of claim 4, wherein the second intermetallic compound included in the conductive connection portion comprises at least one of $Ag_3Sn$, $Cu_3Sn$, and $Cu_6Sn_5$.

6. The multilayer capacitor of claim 2, wherein at least a portion of the conductive connection portion is in direct contact with at least a portion of the electrode layer.

7. The multilayer capacitor of claim 1, wherein the electrode layer has a thickness in a range from 1 µm to 15 µm.

8. The multilayer capacitor of claim 1, wherein the body comprises first and second surfaces facing each other in a stacking direction of the first internal electrode and the second internal electrode, third and fourth surfaces connected to the first and second surfaces and facing each other, and fifth and sixth surfaces connected to the first to fourth surfaces and facing each other,
wherein the electrode layer is disposed on the third and fourth surfaces of the body.

9. The multilayer capacitor of claim 8, wherein the electrode layer extends to a portion of the first, second, fifth, and sixth surfaces of the body.

10. The multilayer capacitor of claim 1, wherein the metal particles included in the conductive resin layer comprise at least one of copper (Cu), silver (Ag), silver (Ag)-coated copper (Cu), and tin (Sn)-coated copper (Cu).

11. The multilayer capacitor of claim 2, wherein the low-melting point metal included in the conductive connection portion is tin (Sn) or a tin (Sn) alloy.

12. The multilayer capacitor of claim 1, wherein the first external electrode and the second external electrode further comprise a plating layer disposed on the conductive resin layer.

13. The multilayer capacitor of claim 12, wherein the plating layer comprises a nickel (Ni) plating layer and a tin (Sn) plating layer, which are sequentially stacked on the conductive resin layer.

14. A multilayer capacitor comprising:
a capacitance forming body portion comprising internal electrodes; and
external electrodes disposed on the capacitance forming body portion, the external electrodes comprising:
an electrode layer disposed on the body portion and comprising glass and a first intermetallic compound, wherein the first intermetallic compound directly contacts the internal electrodes and wherein the glass is dispersed within the first intermetallic compound; and
a conductive resin disposed on the electrode layer and comprising a resin and metal particles dispersed in the resin.

15. The multilayer capacitor of claim 14, wherein the first intermetallic compound comprises tin, and copper or nickel.

16. The multilayer capacitor of claim 14, wherein the electrode layer has a thickness in a range from 1 µm to 15 µm.

17. The multilayer capacitor of claim 14, wherein the conductive resin layer further comprises a conductive connection portion connecting the metal particles, the conductive connection portion including a metal having a melting point lower than a curing temperature of the resin and a second intermetallic compound.

18. The multilayer capacitor of claim 17, wherein the second intermetallic compound comprises tin and copper or silver, and the metal particles comprise at least one of copper (Cu), silver (Ag), silver (Ag)-coated copper (Cu), and tin (Sn)-coated copper (Cu).

19. The multilayer capacitor of claim 14, wherein the external electrodes further comprise one or more plating layers disposed on the conductive resin layer.

* * * * *